(12) United States Patent
Sugawara et al.

(10) Patent No.: US 8,165,776 B2
(45) Date of Patent: Apr. 24, 2012

(54) DRIVE ASSIST SYSTEM

(75) Inventors: Toshiharu Sugawara, Hitachinaka (JP); Atsushi Yokoyama, Tokyo (JP); Takaomi Nishigaito, Kasumigaura (JP); Masatoshi Hoshino, Tsuchiura (JP); Tatsuya Yoshida, Naka (JP); Jun Kubo, Hino (JP); Shinjiro Saito, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 534 days.

(21) Appl. No.: 12/194,887

(22) Filed: Aug. 20, 2008

(65) Prior Publication Data
US 2009/0088925 A1    Apr. 2, 2009

(30) Foreign Application Priority Data
Sep. 27, 2007    (JP) .................... 2007-250408

(51) Int. Cl.
*B60T 7/12* (2006.01)
(52) U.S. Cl. ............... 701/96; 701/301; 340/436
(58) Field of Classification Search ............... 701/1, 36, 701/41, 70, 93, 96, 301; 340/901, 903, 435, 340/436
See application file for complete search history.

(56) References Cited

U.S. PATENT DOCUMENTS

| | | | |
|---|---|---|---|
| 5,521,579 A | | 5/1996 | Bernhard |
| 7,363,140 B2 * | | 4/2008 | Ewerhart et al. ............. 701/96 |
| 2005/0256630 A1 * | | 11/2005 | Nishira et al. ............. 701/96 |
| 2006/0009910 A1 * | | 1/2006 | Ewerhart et al. ............. 701/301 |

FOREIGN PATENT DOCUMENTS

| | | |
|---|---|---|
| DE | 43 13 568 C1 | 6/1994 |
| DE | 10 2005 059 598 A1 | 6/2007 |
| EP | 1 607 264 A1 | 12/2005 |
| EP | 1 777 143 A1 | 4/2007 |
| EP | 1 808 350 A1 | 7/2007 |
| JP | 54-118036 A | 9/1979 |
| JP | 2003-025868 A | 1/2003 |
| JP | 3824784 B2 | 7/2006 |
| JP | 2005-324727 A | 11/2006 |
| WO | WO 03/093867 A2 | 11/2003 |

OTHER PUBLICATIONS

European Search Report dated Sep. 4, 2009 (seven (7) pages).

* cited by examiner

*Primary Examiner* — Helal A Algahaim
(74) *Attorney, Agent, or Firm* — Crowell & Moring LLP

(57) ABSTRACT

A drive assist system includes an assist starting part starting assist, a detection part detecting relative distances and speeds between a vehicles, a calculation part calculating collision risks when changing a lane by the basis of the relative distances and speeds, a first judgment part judging whether the lane can be changed by the relative distances, speeds and the collision risks, a decision part deciding a target space for lane change by the relative distances and speeds when the lane cannot be changed, a second judgment part judging whether a lane changeable space is in the target space, a setting part setting a target speed for the vehicle go to a lane change waiting position when no space and to setting a target speed the vehicle enters a lane changeable position when there is the space, and a control part controlling a speed of the vehicle reaches the target speed.

19 Claims, 13 Drawing Sheets

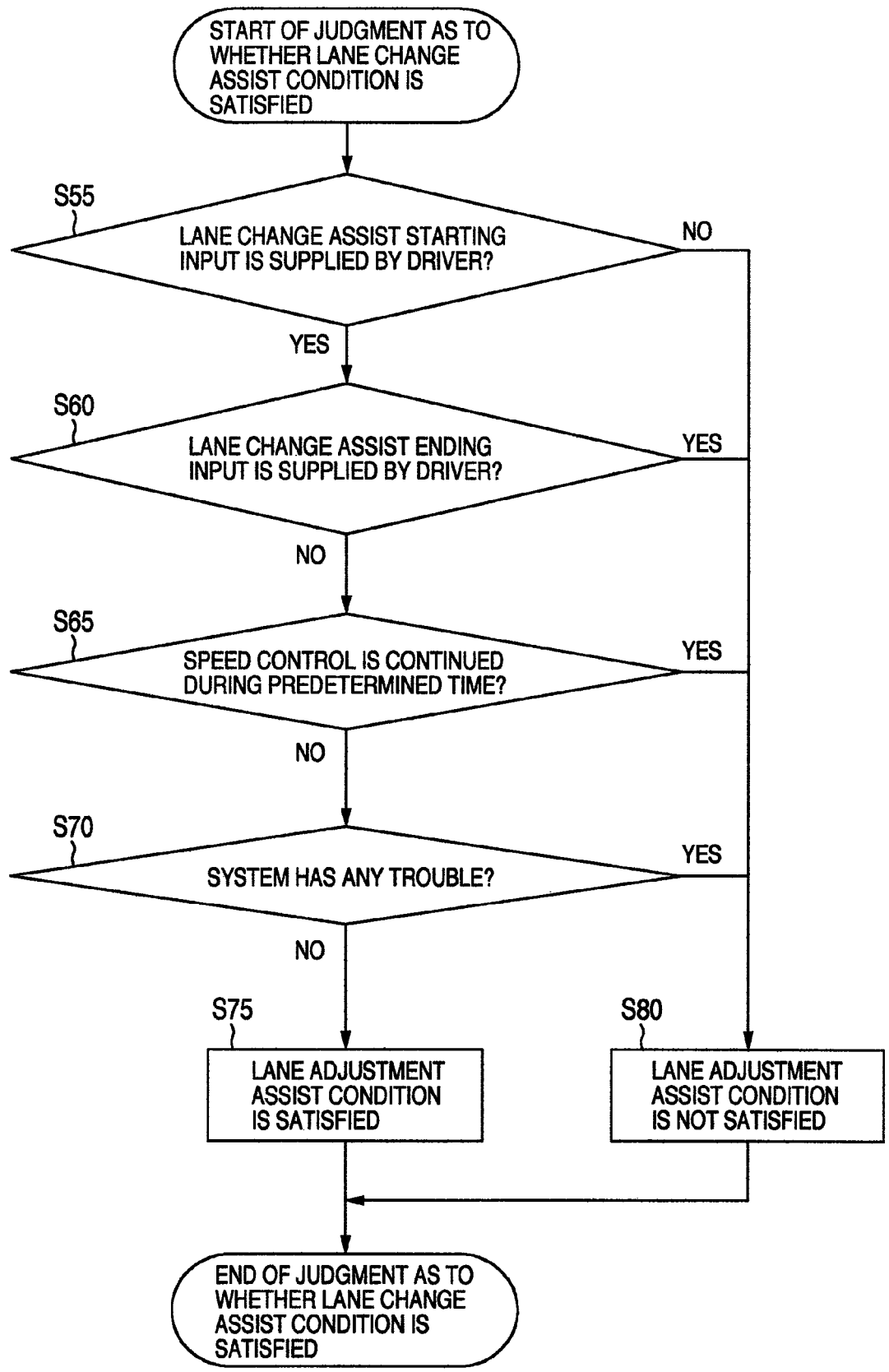

RELATIVE POSITIONS AND RELATIVE SPEEDS TO NEIGHBORING VEHICLES

TIME $T_1$ REQUIRED FOR LANE CHANGE VERSUS VEHICLE SPEED Vo

INDICATION IN CASE WHERE LANE CANNOT BE CHANGED

INDICATION BEFORE SPEED ADJUSTMENT ASSIST

INDICATION OF TARGET SPACE FOR LANE CHANGE

INDICATION OF CONTROL STATE DURING SPEED ADJUSTMENT ASSIST
(DRAWING SHOWS ACCELERATION CONTROL)

CASE 1: THERE IS NO OTHER VEHICLE

CASE 2: INTER-VEHICLE DISTANCE WITH FOLLOWING VEHICLE IS SHORT

CASE 3: INTER-VEHICLE DISTANCE WITH FORWARD VEHICLE IS SHORT

CASE 4: INTER-VEHICLE DISTANCES WITH FORWARD AND FOLLOWING VEHICLES ARE SHORT

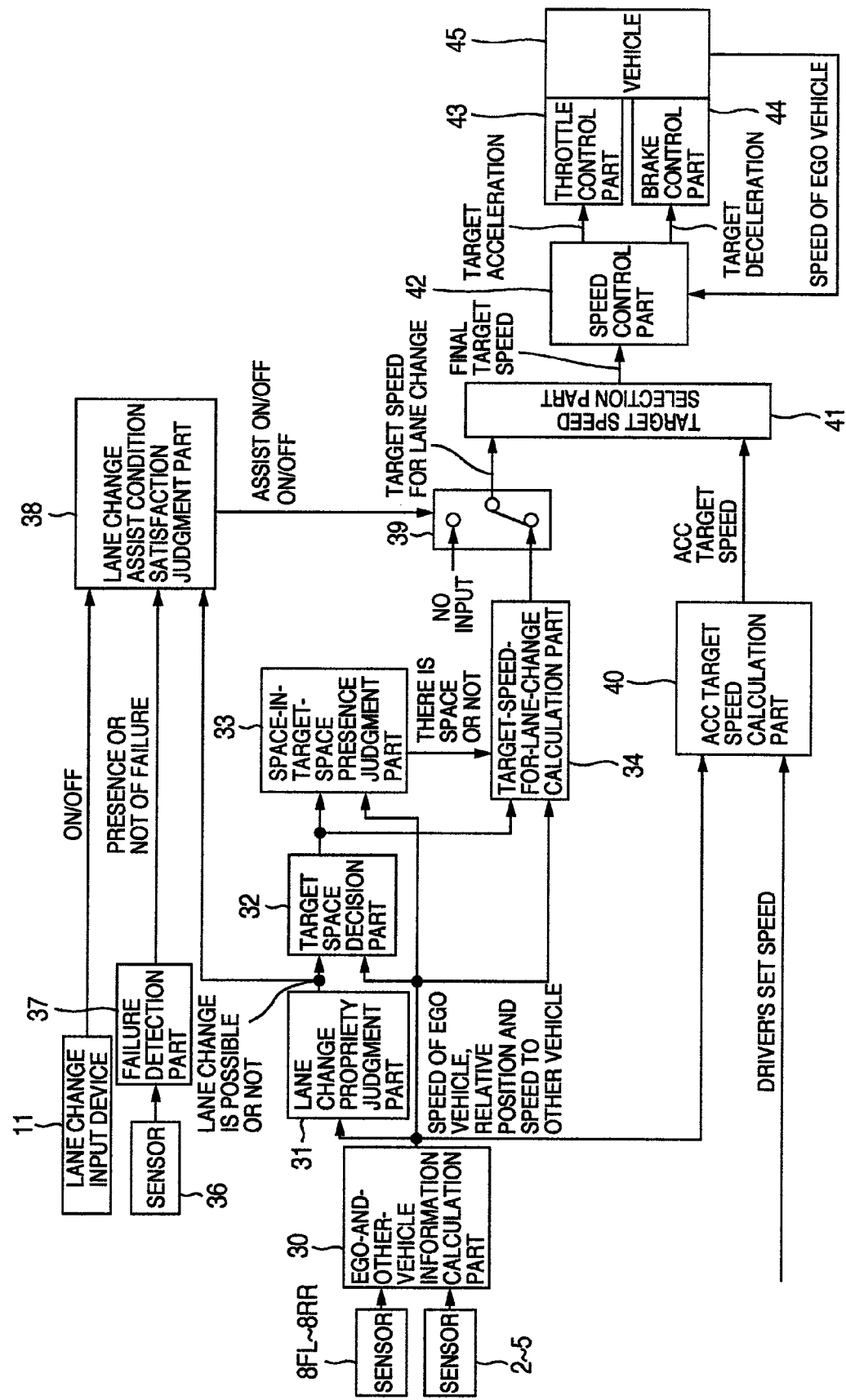

(A) JUDGE THAT LANE CANNOT BE CHANGED (S250)

(B) JUDGE THAT VEHICLE GOES BEFORE OTHER VEHICLE 1 (S350)

(C) CONTROL SPEED TO MAKE VEHICLE GO TO LANE CHANGEABLE POSITION (S600)

(D) CONTROL SPEED TO MAKE VEHICLE GO TO LANE CHANGEABLE POSITION (S600)

(E) JUDGE THAT LANE CAN BE CHANGED (S250)

FIG.14A

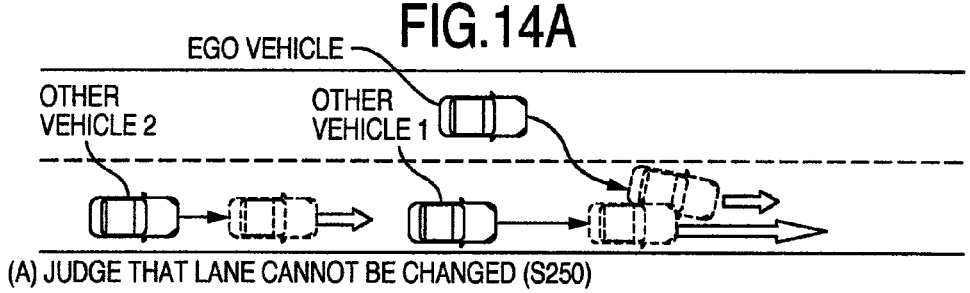

(A) JUDGE THAT LANE CANNOT BE CHANGED (S250)

FIG.14B

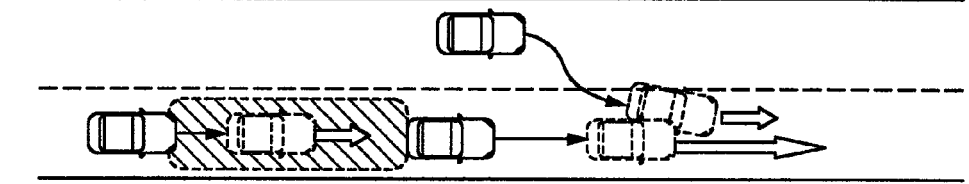

(B) JUDGE THAT VEHICLE GOES BEHIND OTHER VEHICLE 1 (S350)

FIG.14C

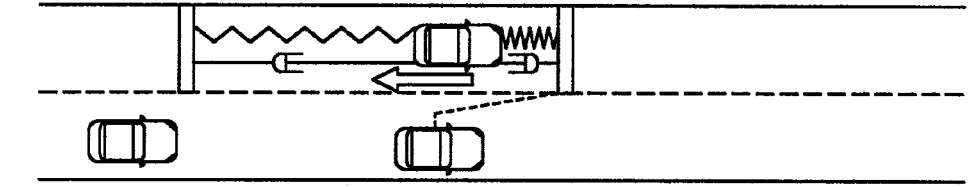

(C) CONTROL SPEED TO MAKE VEHICLE GO TO LANE CHANGE WAITING POSITION (S450)

FIG.14D

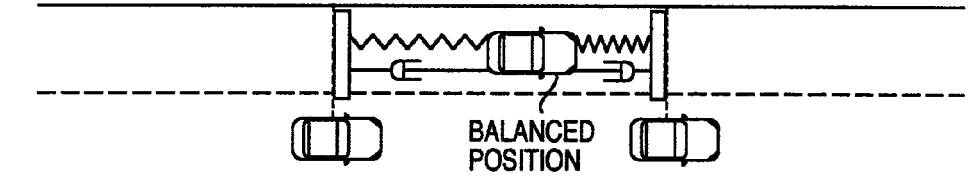

(D) CONTROL SPEED TO MAKE VEHICLE GO TO LANE CHANGE WAITING POSITION (S450) AND WAIT UNTIL OTHER VEHICLE HANDS OVER SPACE

FIG.14E

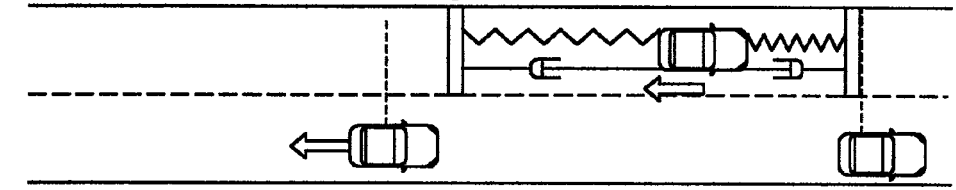

(E) WHEN OTHER VEHICLE 2 HANDS OVER SPACE, CONTROL SPEED TO MAKE VEHICLE GO TO LANE CHANGEABLE POSITION (S600)

FIG.14F

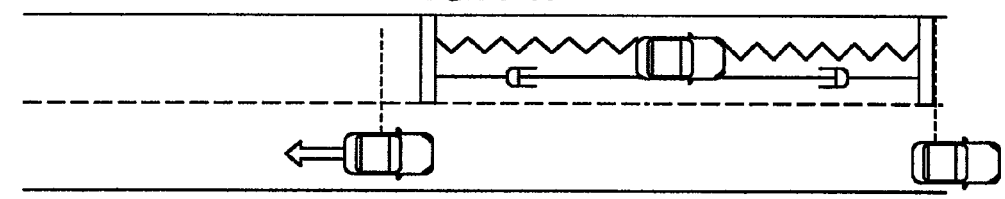

(F) JUDGE THAT LANE CAN BE CHANGED (S250)

DRIVE ASSIST SYSTEM

BACKGROUND OF THE INVENTION

The present invention relates to a drive assist system of a vehicle.

Lane change is a driving action that burdens a driver with a heavy load. There is the technique that the space between vehicles is detected to calculate the speed required to change a lane within a certain prediction time in relation to the detected space and control the vehicle on the basis of the speed (refer to JP-A-2005-324727).

SUMMARY OF THE INVENTION

In JP-A-2005-324727, the speed suited to make the vehicle change the lane in relation to the space is calculated and accordingly in the circumstances that the surroundings are crowded with vehicles so as not to be able to keep the space between the vehicles, that is, in the circumstances that there is not a safely lane changeable space in a target space, the vehicle cannot be guided so as to change the lane.

Accordingly, it is an object of the present invention to provide a drive assist system which makes control to be able to change a lane safely even in the circumstances that there is not the lane changeable space.

In order to solve the above problem, one of desirable aspects of the present invention is as follows.

A drive assist system according to the present invention comprises an assist starting part to start assist of lane change on the basis of input of an input device, a detection part to detect relative distances and relative speeds between a vehicle and other vehicles, a calculation part to calculate collision risks to the other vehicles at the time that the vehicle changes a lane on the basis of the relative distances and the relative speeds detected by the detection part, a first judgment part to judge whether the lane can be changed or not on the basis of the relative distances, the relative speeds and the collision risks, a decision part to decide a target space for lane change on the basis of the relative distances and the relative speeds when the first judgment part judges that the lane cannot be changed, a second judgment part to judge whether there is a lane changeable space in the target space or not, a setting part to set a target speed for making the vehicle go to a lane change waiting position when the second judgment part judges that there is not the space and to set a target speed for making the vehicle go to a lane changeable position when it is judged that there is the space, and a control part to make control so that a speed of the vehicle reaches the target speed.

According to the present invention, there can be provided a drive assist system which makes control to be able to change a lane safely even in the circumstances that there is no lane changeable space.

Other objects, features and advantages of the invention will become apparent from the following description of the embodiments of the invention taken in conjunction with the accompanying drawings.

BRIEF DESCRIPTION OF THE DRAWINGS

FIG. 3 is a flowchart showing processing of judging whether lane change assist condition is satisfied or not;

FIG. 12 is a block diagram schematically illustrating a drive assist system;

FIGS. 14A, 14B, 14C, 14D, 14E and 14F are diagrams illustrating operation results of the system.

DESCRIPTION OF THE EMBODIMENTS

A drive assist system according to an embodiment of the present invention is now described with reference to the accompanying drawings.

Figure 1:
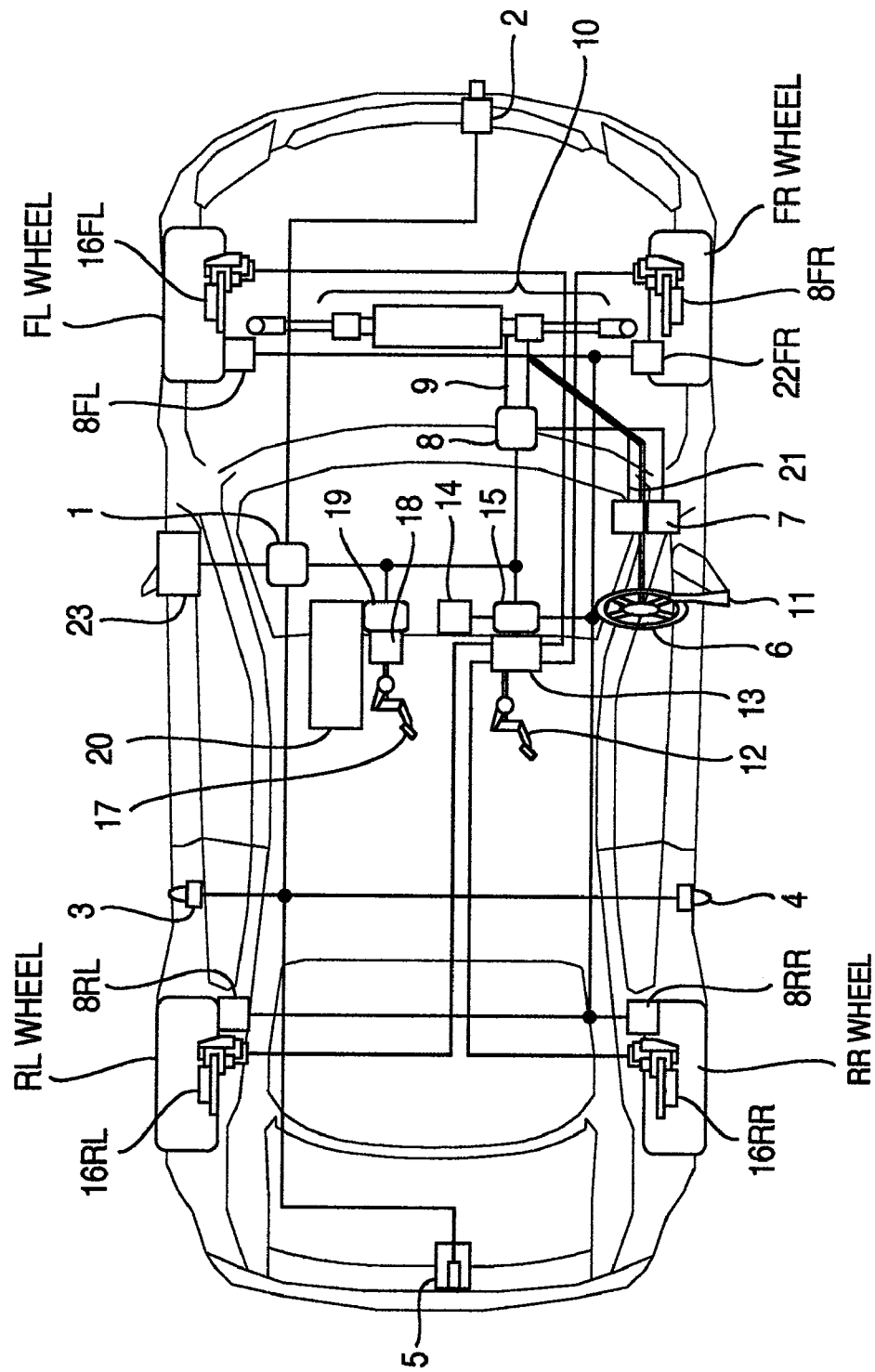
FIG. 1 is a system configuration diagram schematically illustrating a drive assist system according to an embodiment of the present invention.

FIG. 1 is a schematic diagram illustrating the drive assist system. An FL wheel represents a front left wheel, an FR wheel a front right wheel, an RL wheel a rear left wheel and an RR wheel a rear right wheel.

The drive assist system includes sensors 2, 3, 4 and 5 for recognizing or perceiving the outside of a vehicle, a steering control mechanism 10, a brake control mechanism 13 and a throttle control mechanism 20 for assisting to change a lane on the basis of information recognized by the sensors, a warning device 23, a drive assist controller 1 for calculating command values supplied to the actuators 10, 13 and 20, a steering controller 8 for controlling the steering control mechanism 10 on the basis of the command value from the drive assist controller 1, a brake controller 15 for controlling the brake control mechanism 13 on the basis of the command value to adjust distribution of braking force for each wheel and a throttle controller 19 for controlling the throttle control mechanism 20 on the basis of the command value to adjust a torque output of an engine.

The sensors for recognizing the outside of the vehicle include a camera 2 disposed in the front of the vehicle, laser radars 3 and 4 disposed on the right and left sides thereof and a millimeter wave radar 5 disposed in the rear thereof to thereby make it possible to detect relative distances and relative speeds between the vehicle and neighboring vehicles. In the embodiment, a combination of the above sensors is used as an example of sensor structure, although the present invention is not limited thereto and a combination of ultrasonic sensor, stereo camera, infrared camera and the like may be used together with or instead of the above sensors. Signals of the above sensors are supplied to the drive assist controller 1. Moreover, input to a lane change assist input device 11 is supplied to the drive assist controller 1. The lane change assist input device 11 uses, for example, winkers or blinkers and lane change assist operation is decided on the basis of on and off information thereof. However, the lane change assist input device 11 is not limited to the winkers and may use a dedicated input device.

Figure 2:
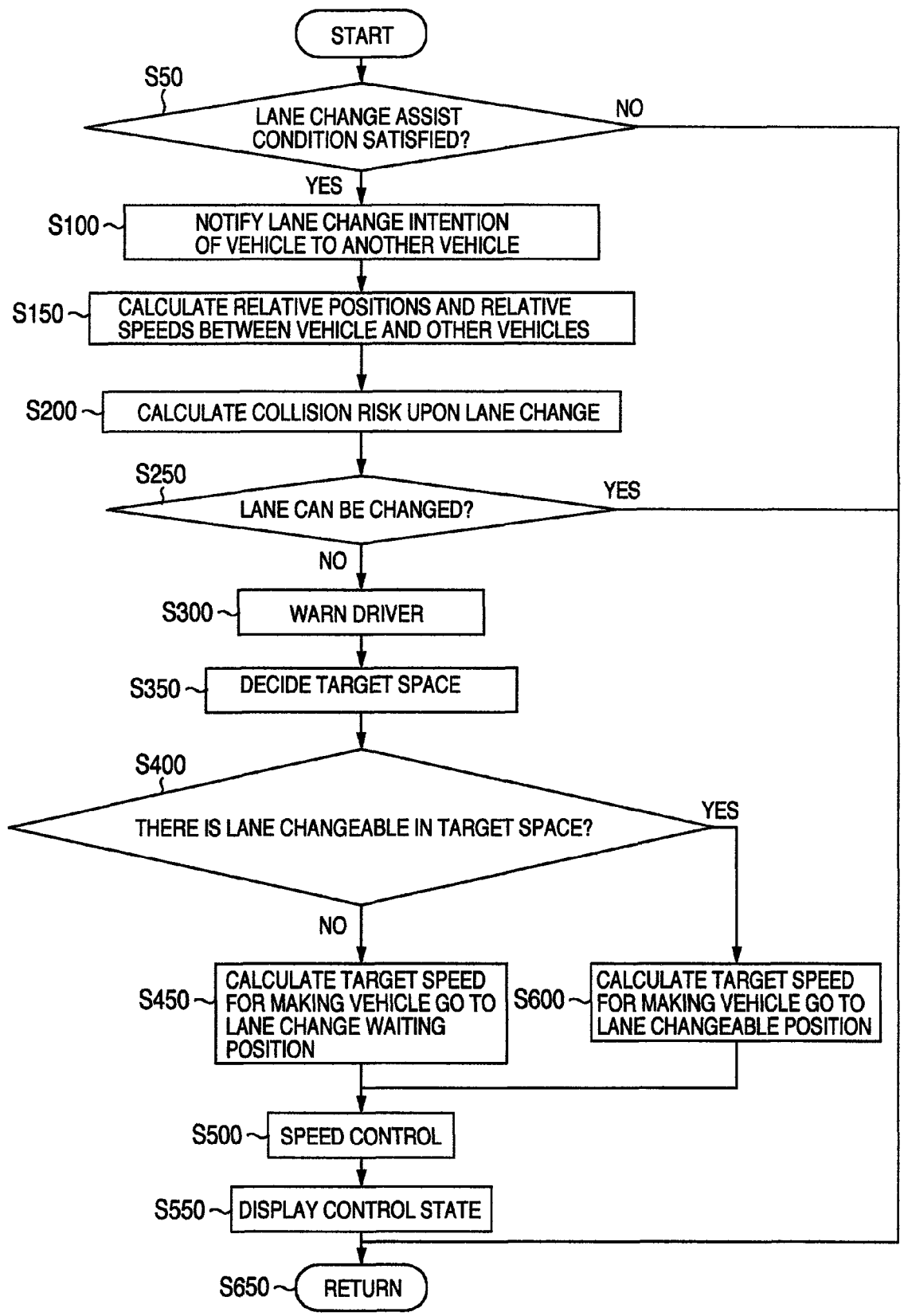
FIG. 2 is a flowchart showing lane change assist processing.

The drive assist controller 1 includes, although not shown, a central processing unit (CPU), a read-only memory (ROM), a random access memory (RAM) and an input/output unit, for example. A processing procedure of vehicle drive assist operation described with reference to FIG. 2 is stored in the ROM. Although described later in detail, the drive assist controller 1 calculates command values supplied to the actuators 10, 13 and 20 for guiding the vehicle so as to make it possible to change a lane on the basis of the relative distances and the relative speeds between the vehicle and the neighboring vehicles detected by the outside recognizing sensors when the lane cannot be changed. The controllers 8, 15 and 19 of the actuators 10, 13 and 20 receive command values of the drive assist controller 1 by communication and control the actuators on the basis of the command values.

Operation of the brake is now described. Driver's pedal effort for stepping on a brake pedal 12 is doubled by a brake booster (not shown) to generate oil pressure in accordance with the pedal effort by a master cylinder (not shown). The generated oil pressure is fed through the brake control mechanism 13 to wheel cylinders 16. The wheel cylinders 16FL to 16RR are composed of cylinders (not shown), pistons, brake pads and the like. The pistons are propelled by brake fluid fed from the master cylinder (not shown) and the brake pads connected with the pistons are pressurized on disk rotors. The disk rotors are rotated together with wheels (not shown). Accordingly, brake torque acting on the disk rotors becomes braking force acting on between the wheels and the road. Thus, braking force can be exerted on the wheels in accordance with the driver's brake pedal operation.

The brake controller 15 includes, for example, a central processing unit (CPU), a read-only memory (ROM), a random access memory (RAM) and an input/output unit similarly to the drive assist controller 1, although not shown in detail in FIG. 1. The driver assist controller 1 is supplied with sensor signals from a combined sensor 14 which can detect longitudinal acceleration, lateral acceleration and yaw rate, sensor signals from wheel speed sensors 8FL to 8RR installed in the wheels, brake force command from the driver assist controller 1 and sensor signal supplied through the steering controller 8 from a steering wheel angle detector 21. Moreover, an output of the brake controller 15 is connected to the brake control mechanism 13 including a pump (not shown) and a control valve and the brake controller 15 can generate arbitrary brake force to apply it to the wheels independent of the driver's brake pedal operation. The brake controller 15 infers spin, drift out and lock of the vehicle on the basis of the above information and generates brake force for relevant wheel to suppress them, so that handling and stability of the driver are enhanced. The drive assist controller 1 can transmit a brake command to the brake controller so that arbitrary brake force can be generated in the vehicle. The present invention is not limited to the brake controller and may use another actuator such as brake-by-wire or the like.

Operation of the steering is now described. Steering torque and angle inputted through a steering wheel by the driver are detected by a steering torque detector 7 and the steering angle detector 21, respectively, and the steering controller 8 controls a motor on the basis of the detected information to generate assist torque. The steering controller 8 also includes, for example, a central processing unit (CPU), a read-only memory (ROM), a random access memory (RAM) and an input/output unit similarly to the drive assist controller 1, although not shown in detail in FIG. 1. The steering control mechanism 10 is operated by resultant force of the driver's steering torque and assist torque by the motor to turn the front wheels. On the other hand, reaction force from the road surface is transmitted to the steering control mechanism in accordance with a turning angle of the front wheel and then transmitted to the driver.

The steering controller 8 can generate torque by means of the motor 9 independent of the driver's steering operation and control the steering control mechanism 10. Accordingly, the drive assist controller 1 can transmit a steering force command to the steering controller 8 to thereby control to turn the front wheels to an arbitrary turning angle. The present invention is not limited to the steering controller and may use another actuator such as steering-by-wire or the like.

An accelerator is now described. A driver's pedal stepping amount of an accelerator pedal 17 is detected by a stroke sensor 18 and inputted to the throttle controller 19. The throttle controller 19 also includes, for example, a central processing unit (CPU), a read-only memory (ROM), a random access memory (RAM) and an input/output unit similarly to the drive assist controller 1, although not shown in detail in FIG. 1. The throttle controller 19 adjusts a throttle opening in accordance with the accelerator pedal stepping amount to control the engine. Thus, the vehicle can be accelerated in accordance with the driver's accelerator pedal operation. Furthermore, the throttle controller can control the throttle opening independent of the driver's accelerator pedal operation. Accordingly, the drive assist controller 1 can transmit an acceleration command to the throttle controller to generate arbitrary acceleration in the vehicle.

According to the above operation, when the driver wishes to change the lane, the brake and the throttle can be adjusted in accordance with circumstances of neighboring vehicles to control the speed of the vehicle properly, so that the vehicle can be guided to a position where the lane can be changed.

FIGS. 2 and 3 are flowcharts showing lane change assist processing stored in the drive assist controller 1 and processing of judging whether lane change assist condition is satisfied or not, respectively.

First, the drive assist controller 1 judges whether the lane change assist condition is satisfied or not (step S50). It is judged whether input for starting the lane change assist input device 11 is supplied by the driver or not (step S55). When the judgment is YES, processing proceeds to step S60 and when it is NO, it is judged that the lane change assist condition is not satisfied (step S80).

Next, the drive assist controller 1 judges whether input for ending the lane change assist input device 11 is supplied by the driver or not (step S60). When the judgment is NO, processing proceeds to step S65 and when it is YES, processing proceeds to step S80.

The drive assist controller 1 judges whether speed control in step S500 described later continues during a predetermined time or not (step S65). When the judgment is NO, processing proceeds to step S70 and when it is YES, processing proceeds to step S80, in which it is judged that the lane change assist condition is not satisfied. The processing of step S65 is performed, so that when the circumstances that the lane cannot be changed continue during the predetermined time or more even if speed control is performed, the speed control can be ended instead of continuing adjustment of speed, so that it can be prevented that the speed control is performed continuously.

The drive assist controller 1 judges whether there is any trouble in the system or not (step S70). When the judgment is YES, processing proceeds to step S80, in which it is judged that the lane change assist condition is not satisfied. When it is NO, processing proceeds to step S75, in which it is judged that the lane change assist condition is satisfied. It is judged whether the lane change assist condition of step S50 is satisfied or not on the basis of the result of steps S55 to S80.

When processing of the drive assist controller 1 proceeds to step S100 when the judgment of step S50 is YES and proceeds to step S65 in which return processing is performed, when it is NO. In the return processing, the processing is returned to the processing of FIG. 2 after the elapse of a predetermined time (several ten milliseconds to several hundred milliseconds). In other words, whether the lane change assist condition is satisfied or not is always judged and when it is satisfied, the lane change assist is started.

Figure 4A:
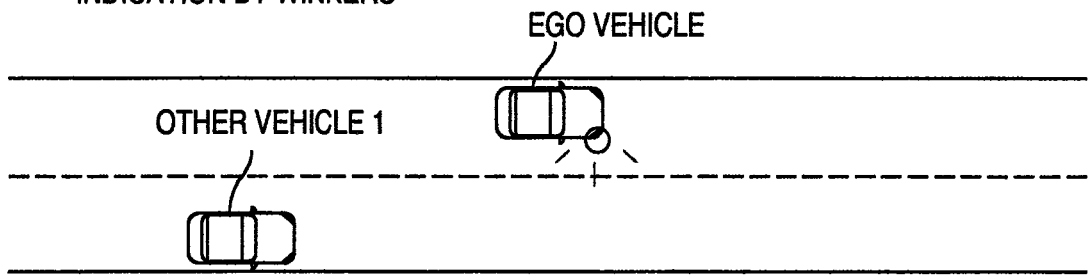
FIGS. 4A, 4B and 4C are diagrams illustrating indication of lane change intention.
Figure 4B:
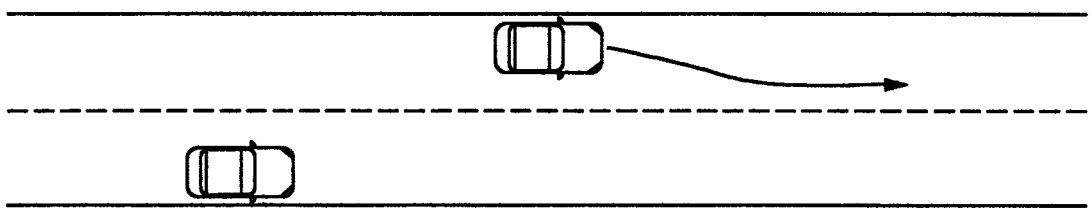
Figure 4C:
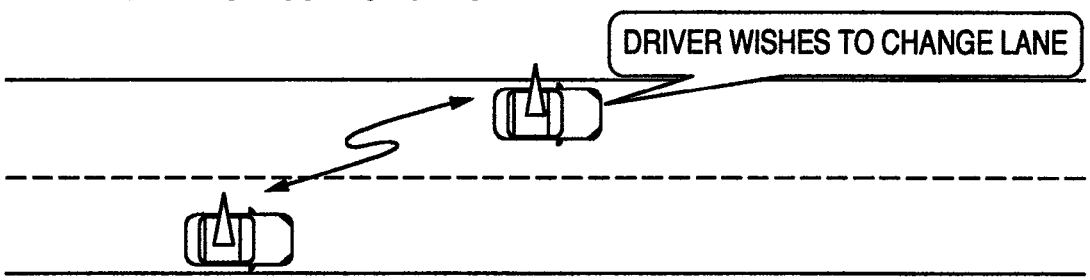

After the processing of step S50, the drive assist controller 1 performs processing of notifying the intention of changing the lane of the vehicle to other vehicles as shown in FIGS. 4A, 4B and 4C (step S100). First, there is a method of turning on winkers as shown in FIG. 4A. In addition, there is a method of controlling the vehicle so that the vehicle is moved along the boundary with the adjacent lane to which the driver wishes to change from the current lane as shown in FIG. 4B. In order to realize the above control, the drive assist controller 1 first detects the lane by using information of the camera 2 disposed in the front of the vehicle. The drive assist controller 1 calculates a target yawing moment necessary for the vehicle on the basis of the speed of the vehicle described later and the lane information. A target steering angle or a target brake force is calculated from the target yawing moment and is transmitted to the steering controller 8 or the brake controller 15. Thus, the vehicle can be controlled to be moved along the boundary with the adjacent lane. Additionally, as the method of notifying the lane change intention of the vehicle to other vehicles in step S100, there is also a method of transmitting the lane change intention of the vehicle to other vehicles by inter-vehicle communication as shown in FIG. 4C. As described above, since the lane change intention of the driver can be transmitted to other vehicles clearly by the processing of step S100, other vehicles can recognize the lane change intention of the vehicle, so that the lane change can be made smoother.

Figure 5:
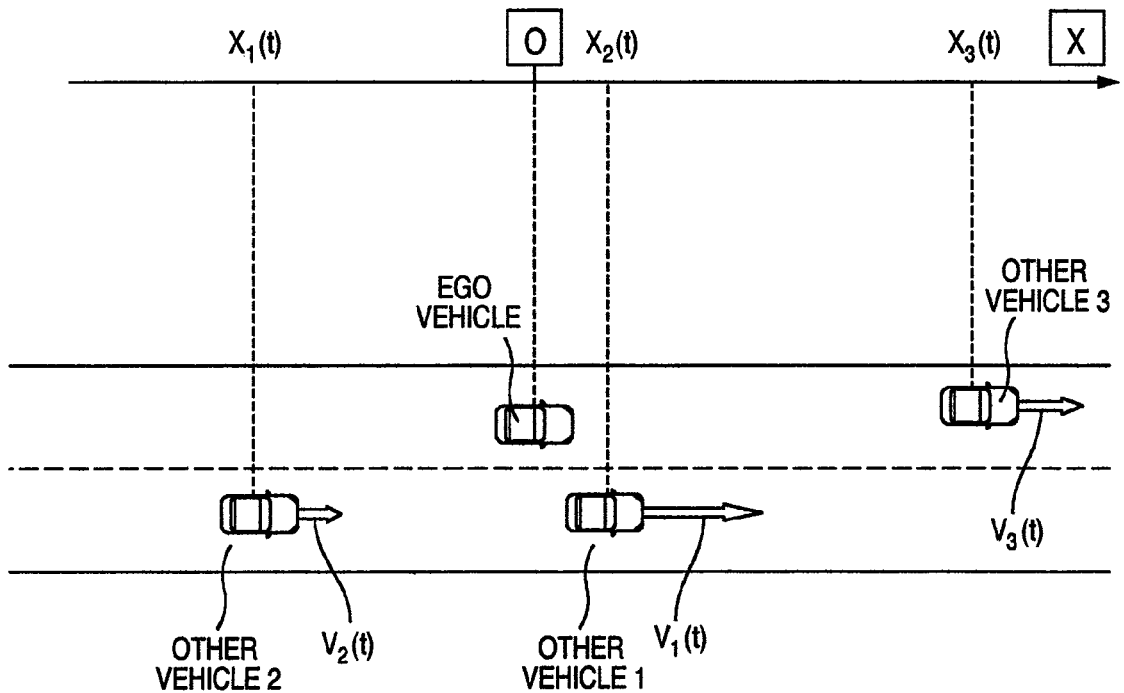
FIG. 5 is a diagram illustrating relative positions and relative speeds of neighboring vehicles.

Next, the drive assist controller 1 calculates relative distances and relative speeds between the vehicle and neighboring vehicles on the basis of information of the camera 2 for detecting the front part of the vehicle, the laser radars 3 and 4 for detecting the side parts of the vehicle and the millimeter wave radar 5 for detecting the rear part of the vehicle as shown in FIG. 5 (step S150). First, the speed of the vehicle is inferred on the basis of information of wheel speed sensors 22FL to 22RR. For example, a highest speed of information of the four wheel speed sensors is selected to be set as the inferred vehicle speed. The inference method of the vehicle speed is not limited thereto and another method of using an average value of the wheel speed sensors may be used. The relative positions and the relative speeds of the other vehicles are expressed in the coordinate systems having the origin set in the center of gravity of the vehicle and the X axis set in the front of the vehicle. The relative distances Xi and the relative speeds Vi between the center of gravity of the vehicle and the neighboring vehicles in the X-axis direction at a time t second are expressed by the following:

$$\begin{cases} X_i(t) \\ V_i(t) = \dot{X}_i(t) \end{cases} (i = 1, 2, \ldots, i) \quad (1)$$

The suffix i represents an i-th vehicle. Further, the relative speed Vi is defined so that the speed in the direction that the neighboring vehicle approaches the vehicle is positive.

Figure 6:
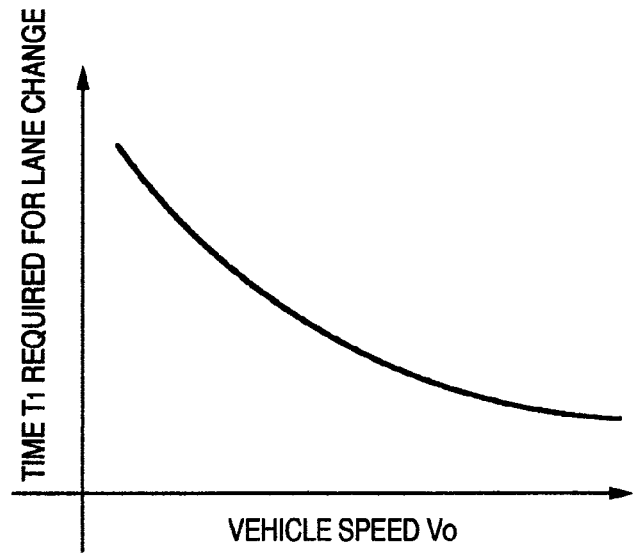
FIG. 6 is a graph showing the relation of vehicle speed Vo and time $T_1$ required for lane change.

The drive assist controller 1 calculates the collision risks in case where the lane is changed on the basis of the relative positions and the relative speeds (step S200). First, the speeds of the vehicle inferred above are applied to the map of the vehicle speed versus the time required for lane change as shown in FIG. 6 to calculate the time required for lane change. The map shown in FIG. 6 is set so that the higher the vehicle speed is, the shorter the time required for lane change is. Thus, the time required for lane change is short at a high speed and the time is long at a low speed, so that the time $T_1$ required for lane change can be calculated properly in accordance with the vehicle speed. Next, an inter-vehicle distance $X_i^{gap}(t+T_1)$ and time to collision or collision prediction time $T_i^{ttc}(t+T_1)$ representing the collision risk (after the time $T_1$ required for lane change) at the time that the lane is changed are calculated on the basis of the calculated time $T_1$ required for lane change by the following expressions.

$$X_i^{gap}(t+T_i) = |X_i(t+T_i)| - (L_0/2 + L_i/2) \quad (2)$$

$$T_i^{ttc}(t+T_i) = \begin{cases} \dfrac{X_i^{gap}(t+T_i)}{V_i(t+T_i)} & (V_i > 0) \\ \infty & (V_i \le 0) \end{cases} \quad (3)$$

where Lo represents the total length (in the front and back direction) of the vehicle and $L_i$ represents the length of a neighboring vehicle i.

Figure 7:
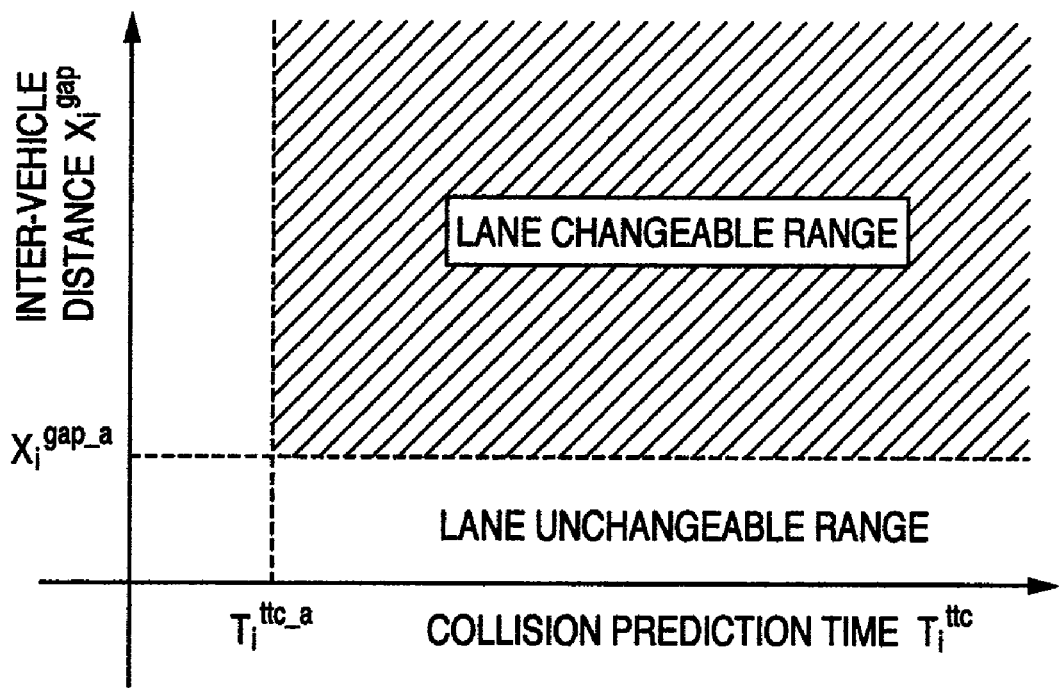
FIG. 7 is a diagram showing judgment as to whether lane change is possible or not.

Next, the drive assist controller 1 judges whether the lane can be changed or not on the basis of the inter-vehicle distance $X_i^{gap}(t+T_1)$ and the collision prediction time $T_i^{ttc}(t+T_1)$ calculated by the expressions (2) and (3) while using FIG. 7 (step S250). The diagram shown in FIG. 7 has the ordinate axis set to the inter-vehicle distance and the abscissa axis set to the collision prediction time. The judgment standard is set so that the lane can be changed when the relative distances and the collision prediction times for all the neighboring vehicles have sufficient time, that is, when the following expressions are satisfied and otherwise the lane cannot be changed.

$$X_i^{gap}(t+T) > X_i^{gap\_a}$$

$$T_i^{TTC} > T_i^{TTC\_a} \quad (4)$$

$X_1^{gap\_a}$ is a threshold for the relative distance (hereinafter referred to as a first predetermined value) for judging whether the lane can be changed to a forward vehicle in a target space and $X_2^{gap\_a}$ is a threshold for the relative distance (hereinafter referred to as a third predetermined value) for judging whether the lane can be changed to a backward or following vehicle in the target space. It is desired that the first and third predetermined values are distances (e.g. 7 m for the first predetermined value and 10 m for the third predetermined value) that it is considered that the lane is not changed regardless of the relative speed when the driver exists within the above relative distances. These predetermined values are not required to be fixed and may be changed in accordance with the vehicle speed or by the driver. On the other hand, $T_1^{TTC\_a}$ is a threshold for the collision prediction time (hereinafter referred to as a second predetermined value) for judging whether the lane can be changed to the forward vehicle in the target space and $T_2^{TTC\_a}$ is a threshold for the collision prediction time (hereinafter referred to as a fourth predetermined time) for judging whether the lane can be changed to the following vehicle in the target space. It is desired that the second and fourth predetermined values are time (e.g. 5 s for the second predetermined value and 6 s for the fourth predetermined value) that the driver feels dangerous when the calculated time falls within the collision prediction time. Further, these predetermined values are not required to be fixed and may be changed in accordance with the vehicle speed or by the driver. According to this judgment standard, for example, when the lane is changed in the state that the collision prediction time is short (the relative speed is large) even if the relative distance is long, that is, when the vehicle is overtaken by the succeeding vehicle immediately after the lane is changed, it is judged that the lane cannot be changed. Even when the relative speed is negative, that is, even when the vehicle is going away, it can be judged that the lane cannot be changed when the relative distance is short. When it is judged that the lane can be changed according to the above judgment, the lane change assist is not required and accordingly processing proceeds to the return processing in step S650. The lane change propriety judgment is not limited to that of FIG. 7 and the definition set in the abscissa axis of FIG. 7 may be replaced with the relative speed. However, a threshold for the relative speed for judging whether the lane can be changed to a forward vehicle in the target space is named a fifth predetermined value and a threshold for the relative speed for judging whether the lane can be changed to a following vehicle in the target space is named a sixth predetermined value.

Figure 8:
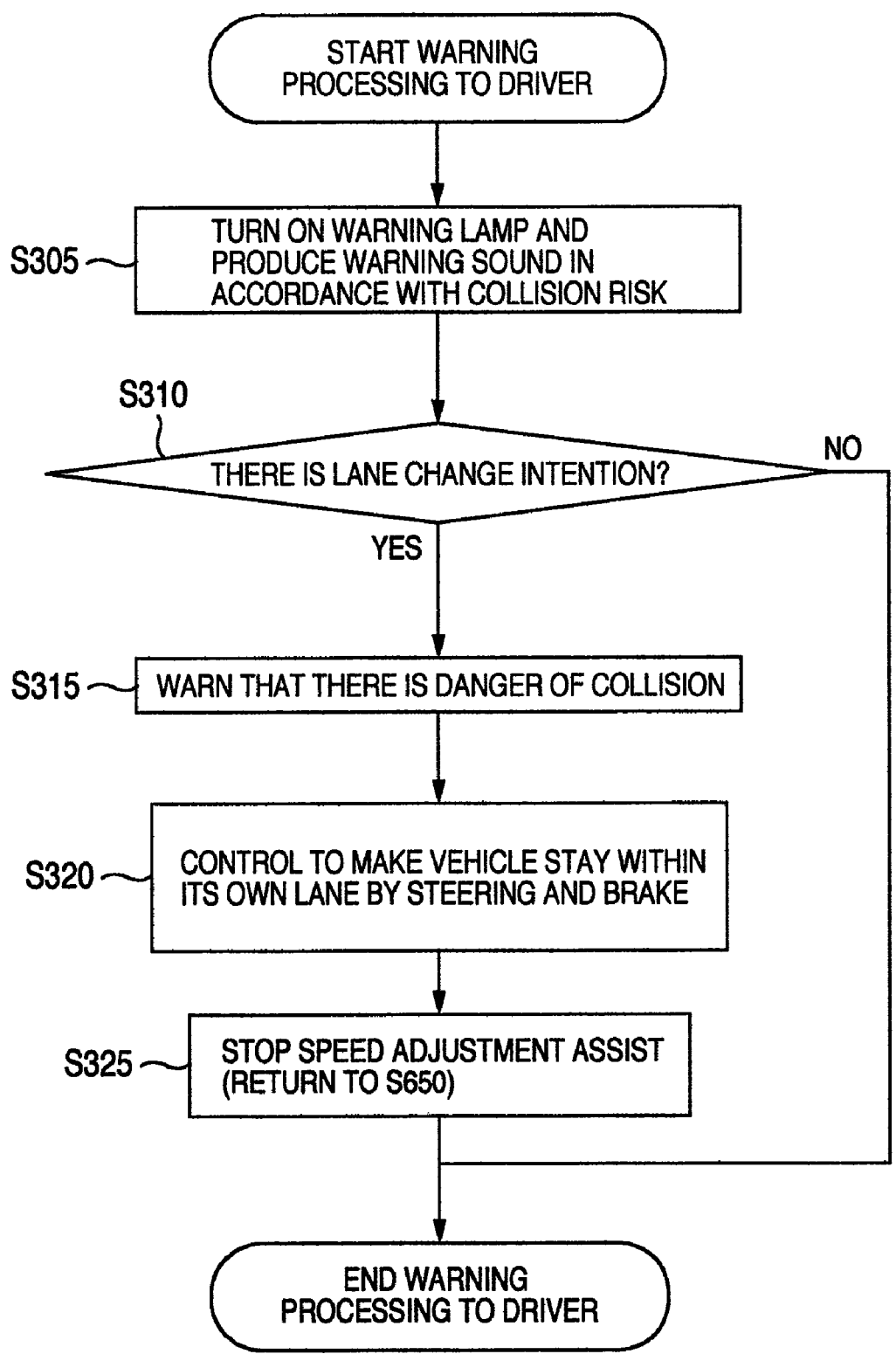
FIG. 8 is a flowchart showing warning processing to the driver.
Figure 9A:
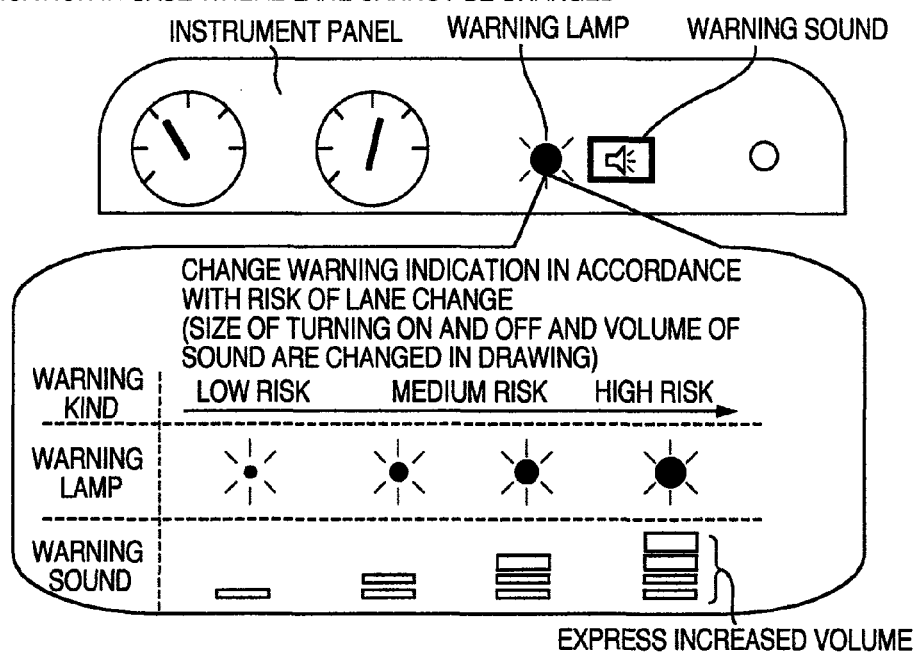
FIGS. 9A, 9B, 9C and 9D are diagrams illustrating display examples of lane change assist.

The drive assist controller 1 performs warning processing to the driver as shown in FIG. 8 (step S300). First, as shown in FIG. 9A, the display size of a warning lamp of a warning device 8 and the volume of warning sound are changed in accordance with the collision risks calculated in step S200 as shown in FIG. 9A so that the driver is informed that the lane cannot be changed (step S305). The display and the volume can be changed in accordance with the collision risks, so that it can be predicted when the driver can change the lane.

The drive assist controller 1 detects the lane change intention on the basis of information of the steering torque detector 7 and lane information detected by the front camera 2 (step S310). For example, when any of the steering torque and an incoming angle at which the vehicle passes through a white line is larger than or equal to a predetermined value, it is judged that the driver has the lane change intention and processing proceeds to step S315. Otherwise, the warning processing to the driver is ended.

When the lane change operation is continued as it is, there is a possibility that the vehicle collides with another vehicle and accordingly the warning lamp is turned on or the warning sound is generated so that the driver's attention is called (step 315). The warning lamp and the warning sound used in step S315 are desirably different from those used in step S305 since both of them can be distinguished easily, so that more effective warning can be attained.

The drive assist controller 1 calculates the target yawing moment on the basis of the distance from the white line detected by the front camera so that the vehicle does not cross the white line (step S320). The drive assist controller 1 calculates the target steering angle or the target brake force of the brake on the basis of the target yawing moment and transmits it to the steering controller 8 or the brake controller 15, respectively. The steering controller 8 and the brake controller 15 drive the steering control mechanism 10 and the brake control mechanism 13 to generate the target steering angle and the target brake force, respectively. Thus, the vehicle can be controlled to be made to stay or exist within its own lane, so that dangerous lane change can be suppressed.

The drive assist controller 1 proceeds to the return processing of step S650 and stops the lane change assist operation (step S325). Consequently, acceleration or deceleration can be controlled during the lane change operation to prevent collision from being induced.

Figure 10:
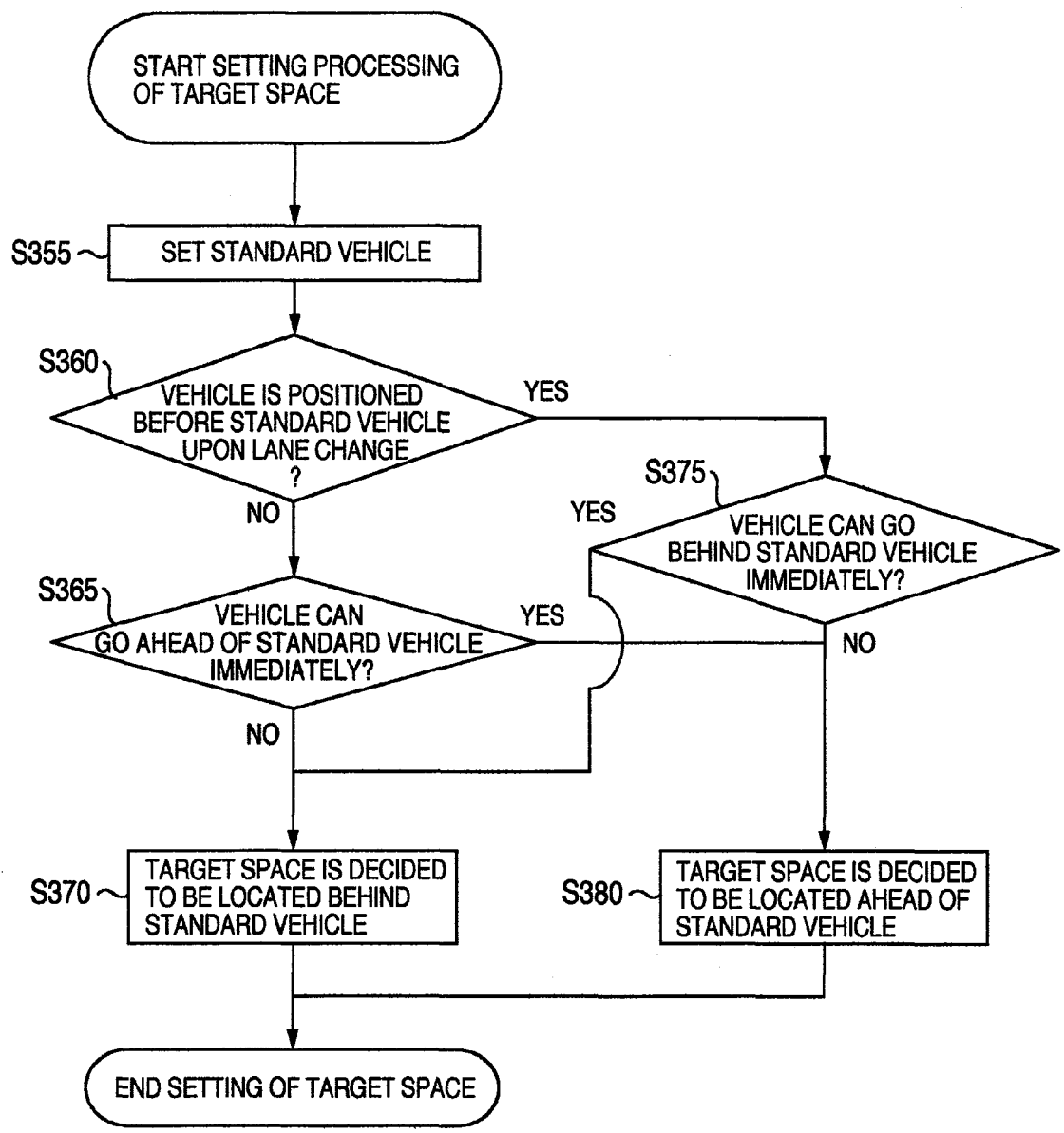
FIG. 10 is a flowchart showing processing of deciding target space.
Figure 11A:
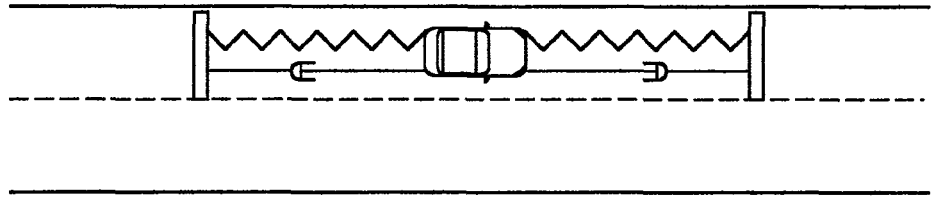
FIGS. 11A, 11B, 11C and 11D are diagrams illustrating control by spring-damper models.
Figure 11B:
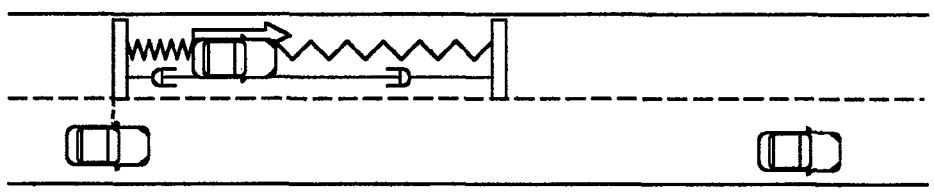
Figure 11C:
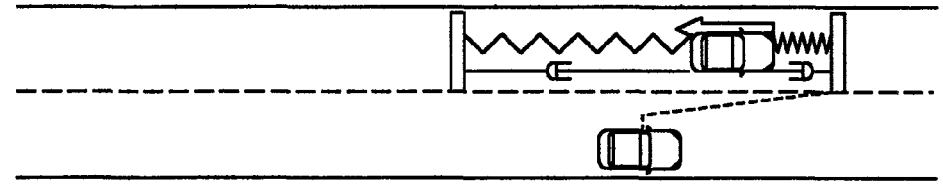
Figure 11D:
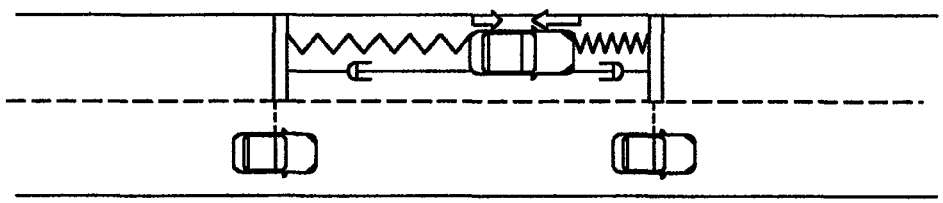

Returning now to FIG. 2, the drive assist controller 1 decides the target space for the lane change (step S350). This processing is performed in accordance with the flowchart shown in FIG. 10. First, the driver assist controller 1 decides a standard vehicle for deciding the target space (step S355).

A vehicle having the shortest relative distance $Xi(t+T_1)$ at the time that the lane is changed is set as the standard vehicle. However, the decision method of the standard vehicle is not limited thereto and the vehicle having the shortest relative distance $Xi(t)$ at present or the vehicle having the shortest collision prediction time may be set as the standard vehicle.

The drive assist controller 1 judges whether the vehicle is positioned before the standard vehicle when the lane is changed or not (step S360). When the judgment is YES, the processing proceeds to step S375 and when it is NO (when the vehicle is positioned before the standard vehicle), the processing proceeds to step S365. In step S365, the drive assist controller 1 judges whether the time required to make the vehicle go ahead of the standard vehicle is shorter than or equal to a predetermined value as described in the following expression (5), that is, the drive assist controller 1 judges whether the vehicle can go ahead of the standard vehicle immediately.

$$T < K_1 \quad (5)$$

$$T = \begin{cases} \dfrac{L^*}{V_i(t+T_i)} & (V_i > 0) \\ \infty & (V_i \leq 0) \end{cases} \quad (6)$$

$$L^* = |X_i| + (L_0/2 + L_i/2) \quad (7)$$

where $K_1$ represents a threshold for judging whether the vehicle can go ahead of the standard vehicle immediately. When the expression (5) is satisfied, that is, when the vehicle can go ahead of the standard vehicle immediately, the processing proceeds to step S380, in which the target space is set to be ahead of the standard vehicle. Conversely, when the expression (5) is not satisfied, that is, when the vehicle cannot go ahead of the standard vehicle immediately, the processing proceeds to step S370, in which the target space is set to be behind the standard vehicle.

In step S375, the drive assist controller 1 judges whether the time required to make the vehicle go behind the standard vehicle is shorter than or equal to a predetermined value as described in the following expression (8), that is, the driver assist controller 1 judges whether the vehicle can go behind the standard vehicle immediately or not.

$$T < K_2 \quad (8)$$

$$T = \begin{cases} \dfrac{L^*}{V_i(t+T_i)} & (V_i < 0) \\ \infty & (V_i \geq 0) \end{cases} \quad (9)$$

$$L^* = |X_i| + (L_0/2 + L_i/2) \quad (10)$$

where K2 represents a threshold for judging whether the vehicle can go behind the standard vehicle immediately or not. When the expression (8) is satisfied, that is, when the vehicle can go behind the standard vehicle immediately, the processing proceeds to step S370, in which the target space is set to be behind the standard vehicle. Conversely, when the expression (8) is not satisfied, that is, when the vehicle cannot go behind the standard vehicle immediately, the processing proceeds to step S380, in which the target space is set to be ahead of the standard vehicle. According to the above operation, the target space for lane change can be decided properly in accordance with the relative positions and the relative speeds to other vehicles.

Returning now to FIG. 2, the drive assist controller 1 judges whether there is a safely lane changeable space in the target space or not in step S400. Incidentally, in step S250, the minimum inter-vehicle distance for judging that the lane can be changed to the forward vehicle and the following vehicle is the first predetermined value $X_1^{gap-a}$ and the third predetermined value $X_2^{gap-a}$, respectively. Accordingly, the minimum value $L_{min}$ of the inter-vehicle space judged that the vehicle can change the lane to both of the forward vehicle and the following vehicle can be calculated by the following expression.

$$L_{min} = X_1^{gap-a} + X_2^{gap-a} + L_0 \quad (11)$$

Accordingly, the judgment as to whether there is the safely lane changeable space in the target space or not can be made by the following expression.

$$|X_1| + |X_2| - (L_1/2 + L_2/2) > L_{min} \quad (12)$$

Figure 9B:
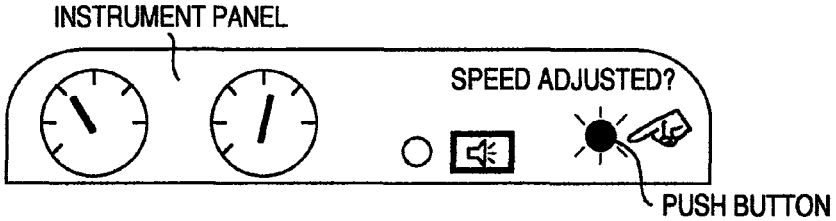

When the expression (12) is not satisfied, that is, when there is the safely lane changeable space in the target space, the processing proceeds to step S450, in which the drive assist controller 1 calculates a target speed for making the vehicle go to a lane change waiting position. Moreover, when the expression (12) is satisfied, there is the safely lane changeable space in the target space and accordingly the drive assist controller 1 calculates the target speed for making the vehicle go to a lane changeable position in step S600. In steps S450 and S600, before the speed control is started, whether the assist operation may be started is confirmed to the driver as shown in FIG. 9B. Consequently, it can be prevented that the speed control accompanied by acceleration and deceleration is performed without any notice and driver's feeling of wrongness can be reduced.

The drive assist controller 1 calculates the target speed for making the vehicle go to a lane change waiting position by the method described below (step S450) when the judgment in step S400 is NO. As shown in FIGS. 11A, 11B, 11C and 11D, there is provided a virtual spring-damper model which functions when the relative distance between the vehicle and the forward vehicle in the target space is shorter than or equal to the first predetermined value and in which force $F_1$ put out in accordance with the relative distance is changed. Moreover, there is provided a virtual spring-damper model which functions when the relative distance between the vehicle and the following vehicle in the target space is shorter than or equal to the third predetermined value and in which force $F_2$ put out in accordance with the relative distance is changed. A target speed $V^{ref}$ of the vehicle is calculated on the basis of the resultant force of the force put out by the spring-damper model provided in front of the vehicle and the force put out by the spring-damper model provided behind the vehicle as described in the following expression (13).

$$V^{ref} = \frac{1}{Ms}\{F_1 + F_2\} \quad (13)$$

$$F_1 = (K_1 + sD_1)\Delta X_1 \quad (14)$$

$$F_2 = (K_2 + sD_2)\Delta X_2 \quad (15)$$

$$\Delta X_i = \quad (16)$$

$$\begin{cases} L_i^{spr\_a} & L_i^{spr} - (|X_i(t)| - (L_0/2 + L_i/2)) > L_i^{spr\_a} \\ L_i^{spr} - (|X_i(t)| - (L_0/2 + L_i/2)) & L_i^{spr\_a} > L_i^{spr} - (|X_i(t)| - (L_0/2 + L_i/2)) > 0 \\ 0 & 0 > L_i^{spr} - (|X_i(t)| - (L_0/2 + L_i/2)) \end{cases}$$

where M represents mass, S the Laplace operator, $L_i^{spr}$ (i=1, 2) the natural length of the virtual spring-damper model (i=1, 2), $L_i^{spr\_a}$ a maximum change amount of the spring-damper model, $K_i$ and $D_i$ a spring constant and a damper constant of the virtual spring-damper model for the vehicle i, respectively. As described in the expression (16), the change amount of the spring-damper model never exceeds the maximum value ($L_i^{spr\_a}$) so as not to exert unnecessarily large force on a vehicle.

The natural length $L_i^{spr}$ of the virtual spring-damper model is desirably set to $L_1^{spr} = X_1^{gap-a}$ and $L_2^{spr} = X_2^{gap-a}$. By setting the natural length in this manner, the spring-damper model necessarily functions in the inter-vehicle distance judged that the lane change is impossible in step S250 and the vehicle can be controlled to be moved to the lane changeable position. Moreover, it is desirable that the spring constant and the damper constant are set to proper values so as to be able to calculate a hunting-less smooth target speed. Further, the spring constant K1 of the following vehicle is set to be larger than the spring constant K2 of the forward vehicle, so that when the forward and backward spring-damper models are balanced at the resultant force thereof, the vehicle can be controlled to be moved to a position where the relative distance between the vehicle and the forward vehicle is smaller than the relative distance between the vehicle and the following vehicle. This position is defined as the lane change waiting position. In other words, the lane change waiting position can be defined as the position where the following vehicle can hand over the space to the vehicle without stress or the position where the center of gravity of the vehicle is positioned behind as compared with that of the forward vehicle or the position where the nose of the vehicle is aligned with the tail of the forward vehicle.

The foregoing has described the control method in case where there is the safely lane changeable space in the target space. The target speed is produced to reach the position where the forces put out by the spring-damper models in accordance with the expressions (13) to (16) are balanced finally. Consequently, the drive assist controller calculates the target speed for making the vehicle go to the position near the forward vehicle, that is, the lane change waiting position.

The drive assist controller 1 calculates the target speed for making the vehicle go to the lane changeable position when the judgment of step S400 is YES (step S600). The calculation expressions of the target speed are the same as the expressions (13) to (16) of step S450. However, the processing of step S600 has the condition different from that of step S400 and is the case where the expression (12) is not satisfied, that is, the case where the vehicle can be controlled to change the lane without making another vehicle hand over the space. In this case, any one of the spring-damper models functions to the forward or following vehicle judged that the lane cannot be changed in step S250 and the drive assist controller calculates the target speed for making the vehicle go to the lane changeable position. Consequently, the vehicle is controlled to the lane changeable position in the judgment of step S250. This position is defined as the lane changeable position.

Figure 9C:
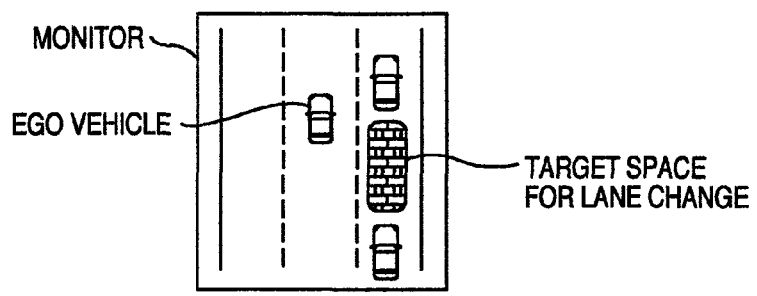
Figure 9D:
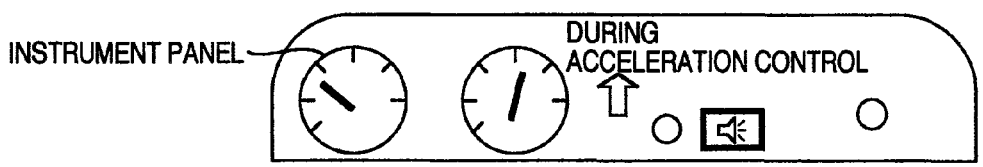

In step S500, the drive assist controller 1 controls the throttle controller 19 and the brake controller 15 to control the speed of the vehicle on the basis of the target speed calculated in step S450 or S600. In step S550, the target space is displayed as shown in FIG. 9C or the control state of the speed adjustment assist is displayed as shown in FIG. 9D. Consequently, the driver is apt to predict acceleration and deceleration effected by the drive assist controller 1, so that driver's feeling of wrongness can be reduced.

FIG. 12 is a block diagram schematically illustrating the drive assist system and expresses the flowchart of FIG. 2 as the block diagram. However, for the simplicity of the drawing, steps S100, S300 and S550 are omitted.

An ego-and-other-vehicle information calculation part 30 calculates the speed of the vehicle and the relative positions and the relatives distance to other vehicles on the basis of sensor signals from the wheel speed sensors 8FL to 8RR installed in the wheels, the camera 2 disposed in the front of the vehicle, the laser radars 3 and 4 disposed on both the right and left sides and the millimeter wave radar 5 disposed in the rear of the vehicle. A lane change propriety judgment part 31 judges whether the lane can be changed on the basis of the speed of the vehicle and the relative positions and the relative distances to other vehicles. A target space decision part 32 decides the target space for lane change on the basis of the speed of the vehicle and the relative positions and the relative distances to other vehicles when it is judged that the lane cannot be changed. A space-in-target space presence judgment part 33 judges whether there is the safely lane changeable space in the target space or not. A target-speed-for-lane-change calculation part 34 calculates the target speed for lane change on the basis of the target space, the relative positions and the relative speeds to other vehicles and presence of the space in the target space.

A lane change assist condition satisfaction judgment part 38 for controlling to turn on and off the speed adjustment assist is now described. The lane change assist condition satisfaction judgment part 38 is supplied with lane change on-and-off input information that is the driver's lane change intention by means of the lane change assist input device 11. Further, the lane change assist condition satisfaction judgment part 38 is supplied with information as to whether failure occurs in the system or not, detected by a failure detection part 37 from a signal of a failure detection sensor 36 for detecting failure in the drive assist system. As the failure detection sensor, for example, there are a supply voltage sensor for monitoring a power supply voltage and a wheel cylinder type pressure sensor for monitoring the brake. However, these sensors are taken as examples of the failure detection sensor and the present invention is not limited thereto. Moreover, the lane change condition satisfaction judgment part 38 is also supplied with information as to whether the lane can be changed or not, produced by the lane change propriety judgment part.

As described above, the lane change condition satisfaction judgment part 38 judges whether the lane change assist condition is satisfied or not on the basis of the lane change input on-and-off information, the information as to whether failure occurs in the system or not and the information as to whether the lane can be changed or not and switches the on-and-off switch 39 for the lane change assist shown in FIG. 12 on the basis of the judgment result. As shown in FIG. 12, when the lane change assist is off, the lane change target speed is not inputted and the target speed for the adaptive cruise control (ACC) described later is set as the final target speed.

A target speed calculation part 40 for the adaptive cruise control (ACC) is now described. In the adaptive cruise control, the target speed calculation part 40 calculates an ACC target speed on the basis of the driver's set speed, the speed of the vehicle and the relative positions and the relative speeds to other vehicles. A target speed selection part 41 selects a proper vehicle speed from the lane change target speed and the ACC target speed and decides the final target speed. Generally, the lower the vehicle speed is, the safer operation is ensured and accordingly it is desirable to select the lower target speed, although the present invention is not limited thereto. A speed control part 42 calculates target acceleration and target deceleration on the basis of the final target speed to be supplied to a throttle control part 43 and a brake control part 44, respectively. The throttle control part 43 controls the throttle on the basis of the target acceleration to accelerate the vehicle. On the other hand, the brake control part 44 controls the brake control mechanism 13 on the basis of the target deceleration to decelerate the vehicle.

Referring now to FIGS. 13 and 14, operation of the system to which the contents of the flowchart shown in FIG. 2 and the block diagram shown in FIG. 12 are applied is described.

Figure 13A:
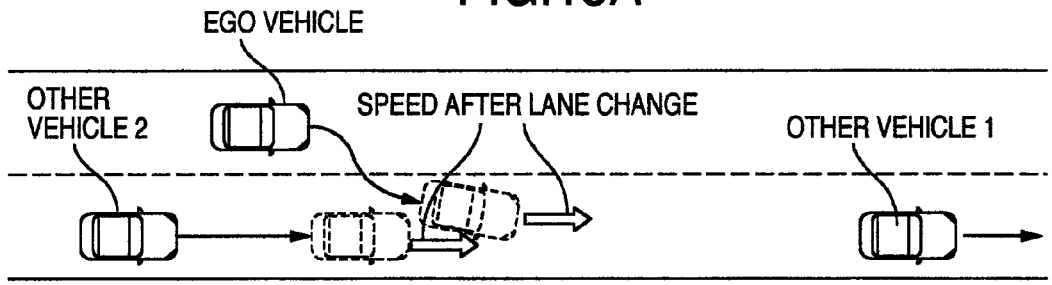
FIGS. 13A, 13B, 13C, 13D and 13E are diagrams illustrating operation results of the system.
Figure 13B:
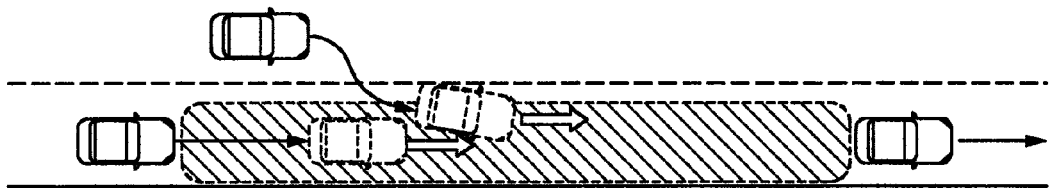
Figure 13C:
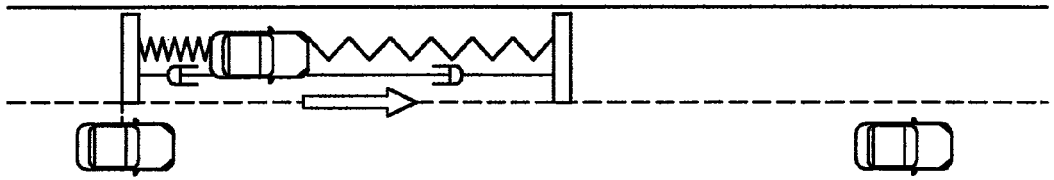
Figure 13D:
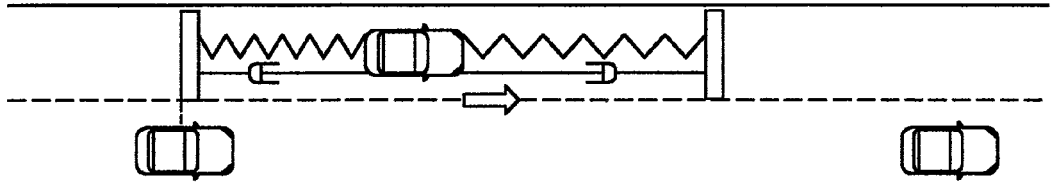
Figure 13E:
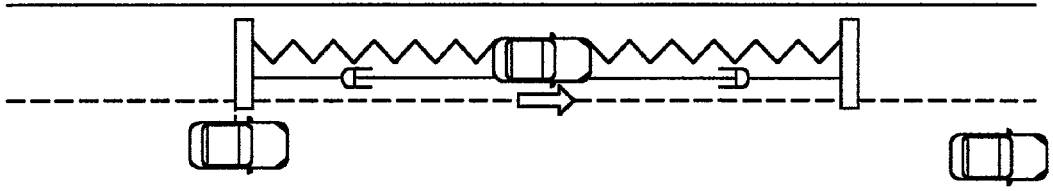

FIGS. 13A to 13E illustrate operation examples in case where the target space is set in the front of another vehicle 2 and the vehicle is controlled to go to the lane changeable position. First, in FIG. 13A, the collision risks for other vehicles 1 and 2 are calculated (step S200) and whether the lane can be changed or not is judged (step S250). In the example shown in FIG. 13A, since the collision risk that the other vehicle 2 collides with the vehicle is increased, it is judged that the lane cannot be changed. At this time, the driver is warned by the warning lamp and the warning sound to the effect that the lane cannot be changed (step S300). Next, in FIG. 13B, since it is judged that the vehicle is positioned before the other vehicle 2 after lane change and the vehicle cannot go behind the other vehicle 2 immediately, the space before the other vehicle 2 is decided as the target space (step S350). In FIGS. 13C and 13D, it is judged that there is the safely lane changeable space in the target space (step S400), so that the virtual spring-damper model installed behind the vehicle functions to control the speed to make the vehicle go to the lane changeable position (steps S600 and S500). At this time, the driver is notified that the target space is positioned before the other vehicle 2 and the vehicle is controlled to be accelerated or decelerated so as to go to the target space (step S550). In FIG. 13E, as the result of the above control, the vehicle is controlled in the lane changeable position. At this time, it is judged that the lane can be changed (step S250), so that the speed control is ended and the warning using the warning lamp and the warning sound is ended.

FIGS. 14A to 14F illustrate operation examples in case where the target space is set behind another vehicle 1 and the vehicle is controlled to go to the lane change waiting position. FIG. 14A illustrates the same processing as in FIG. 13 and description thereof is omitted. Next, in FIG. 14B, since it is judged that the vehicle is positioned before the other vehicle 1 after lane change and the vehicle can go behind the other vehicle 1 immediately, the space behind the other vehicle 1 is decided as the target space (step S350). In FIG. 14C, it is judged that there is not the safely lane changeable space in the target space (step S400), so that the virtual spring-damper models installed before and behind the vehicle function to control the speed to make the vehicle go to the lane change waiting position (steps S450 and S500). At this time, the driver is notified of the position of the target space and that the vehicle is controlled to be accelerated or decelerated so as to go to the target space (step S550). In FIG. 14D, as the result of the above control, the vehicle is controlled to go to the lane change waiting position, that is, the position where the vehicle is nearer to the forward vehicle than the following vehicle. The vehicle waits in this position until the other vehicle hands over the space to the vehicle. It is desirable that the time required to control to make the vehicle go to the lane change waiting position continues for at least the time or more (e.g. 5 sec.) required to judge whether the following vehicle in the target space hands over the space to the vehicle or not. Then, as shown in FIG. 14E, when the other vehicle 2 hands over the space for lane change to the vehicle, it is judged that there is the safely lane changeable space in the target space in step S400 and the speed control is started to make the vehicle go to the lane changeable position. Finally, as shown in FIG. 14F, the vehicle is controlled to go to the lane changeable position as the result of the above control. At this time, it is judged that the lane can be changed (step S250) and the speed control is ended. Further, the warning using the warning lamp and the warning sound is ended.

As described above, according to the drive assist system described in the embodiment 1, the speed of the vehicle can be adjusted to change the lane and a burden on the driver upon lane change can be reduced in the lane unchangeable circumstances such as the circumstances that there is not the safely lane changeable space in the target space in which the vehicle cannot be guided heretofore so as to change the lane.

The prior art has a problem that when the lane change is most difficult and the driver wishes to guide the lane change, the vehicle cannot be guided to change the lane. However, the speed of the vehicle can be always adjusted to change the lane in the lane unchangeable circumstances such as the circumstances that there is the safely lane changeable space in the target space, so that a burden on the driver upon lane change can be reduced.

The foregoing has described the embodiments, although concrete configuration is not limited to the embodiments and modifications and changes in design that fall within the ambit of the gist of the present invention are contained in the present invention.

The invention claimed is:

1. A drive assist system comprising:
an assist starting part to start assist of lane change on a basis of an input of an input device;
a detection part to detect relative distances and relative speeds between a vehicle and other vehicles;
a calculation part to calculate collision risks to the other vehicles at a time that the vehicle changes a lane on a basis of the relative distances and the relative speeds detected by the detection part;
a first judgment part to judge whether the lane can be changed or not on the basis of the relative distances, the relative speeds and the collision risks;
a decision part to decide a target space for lane change on the basis of the relative distances and the relative speeds when the first judgment part judges that the lane cannot be changed;
a second judgment part to judge whether there is a lane changeable space in the target space or not;
a speed setting part to set a target speed for making the vehicle go to a lane change waiting position, the lane change waiting position representing a position in which a relative distance between the vehicle and a forward vehicle in the target space is shorter than a relative position between the vehicle and a following vehicle in the target space, when the second judgment part judges that there is not a lane changeable space and to set the target speed for making the vehicle go to a lane changeable position when the second judgment part judges that there is the space; and
a control part to make control so that a speed of the vehicle reaches the target speed.

2. A drive assist system according to claim 1, wherein
the lane changeable position represents a position in which the first judgment part judges that the lane can be changed.

3. A drive assist system according to claim 1, wherein
a condition that speed control for making the vehicle go to the lane change waiting position is ended corresponds to at least one of a case where it is judged that there is a safely lane changeable space in the target space, a case where driver's input for ending lane change is detected, a case where speed control continues during predetermined time or more and a case where a driver starts lane change.

4. A drive assist system according to claim 1, wherein
a condition that lane change assist is not started corresponds to at least one of a case where a start input from the input device is not detected, a case where an end input from the input device is detected, a case where speed control continues during predetermined time or more and a case where failure is detected in the system.

5. A drive assist system according to claim 1, further comprising:
an intention indication part to indicate intention of lane change to neighboring vehicles using at least one of indication by winkers, control of making the vehicle move along a boundary with an adjacent lane to which the vehicle is desired to be changed and offer of information to a vehicle on a lane to which the vehicle is to transfer by vehicle-to-vehicle communication.

6. A drive assist system according to claim 1, wherein
the collision risk represents time to collision of the vehicle with the neighboring vehicles.

7. A drive assist system according to claim 6, wherein
a condition that the lane can be changed corresponds to any one of:
a case where the relative distance between the vehicle and the forward vehicle in the target space at the time that the lane is changed is longer than or equal to a first predetermined value and the time to collision is longer than or equal to a second predetermined value, the relative distance between the vehicle and the following vehicle in the target space at the time that the lane is changed being longer than or equal to a third predetermined value, the time to collision being longer than or equal to a fourth predetermine time; and
a case where the relative distance between the vehicle and the forward vehicle in the target space at the time that the lane is changed is longer than or equal to the first predetermined value and the relative speed thereof is slower than or equal to a fifth predetermined value, the relative distance between the vehicle and the following vehicle in the target space at the time that the lane is changed being longer than or equal to the third predetermined value, the relative speed thereof being slower than or equal to a sixth predetermine time.

8. A drive assist system according to claim 7, wherein the case where there is the lane changeable space in the target space corresponds to a case where the target space is longer than or equal to a sum of the first predetermined value, the third predetermined value and the total length of the vehicle.

9. A drive assist system according to claim 1, further comprising:
an indication change part to change indication by an alarm or a warning lamp in accordance with the collision risk when it is judged that the lane cannot be changed.

10. A drive assist system according to claim 1, further comprising
a selection part to, when lane change intention of the vehicle is detected while it is judged that the lane cannot be changed, select at least one operation of the following:
warning that there is danger of collision;
putting out force to stay the vehicle within its own lane by means of steering or braking; and
stopping speed control.

11. A drive assist system according to claim 1, further comprising:
a space setting part to, when a vehicle nearest to the vehicle is set as a standard vehicle upon lane change and the vehicle cannot go before and behind the standard vehicle immediately, set the target space in the front of the standard vehicle and to, when the vehicle can go before and behind the standard vehicle immediately, set the target space in the rear of the standard vehicle.

12. A drive assist system according to claim 1, further comprising:
a space setting part to, when a vehicle nearest to the vehicle is set as a standard vehicle upon lane change and the vehicle can go behind and before the standard vehicle immediately, set the target space in the front of the standard vehicle and to, when the vehicle cannot go behind and before the standard vehicle immediately, set the target space in the rear of the standard vehicle.

13. A drive assist system according to claim 1, further comprising:
a speed adjustment indication part to indicate to the driver that speed adjustment is performed before the speed adjustment; and
a speed adjustment starting part to start the speed adjustment in response to driver's start input of speed adjustment assist.

14. A drive assist system according to claim 1, further comprising
an indication part to display at least one of the target space and acceleration and deceleration of the vehicle generated for the speed adjustment during speed control.

15. A drive assist system according to claim 7, wherein
the target speed setting of the vehicle controlled to go to the lane change waiting position and the target speed setting of the vehicle controlled to go to the lane changeable position mean that
a virtual spring-damper model which functions when the relative distance between the vehicle and the forward vehicle in the target space is shorter than or equal to the first predetermined value and puts out force in accordance with the relative distance is provided before the vehicle and a virtual spring-damper model which functions when the relative distance between the vehicle and the following vehicle in the target space is shorter than or equal to the third predetermined value and puts out force in accordance with the relative distance is provided behind the vehicle, so that the target speed of the vehicle is set on the basis of resultant force of forces put out by the spring-damper models provided before and behind the vehicle.

16. A drive assist system according to claim 1, further comprising:
a lane change start condition satisfaction judgment part to control start and end of lane change assist;
an ego-and-other-vehicle information calculation part to calculate information of relative distances and relative speeds between the vehicle and the neighboring vehicles;
a lane change propriety judgment part to calculate collision risks for the neighboring vehicles at the time that the vehicle changes the lane on the basis of the information and judge whether the vehicle can change the lane or not on the basis of the collision risks;
a target space decision part to decide a space for lane change on the basis of relative positions and relative speeds between the vehicle and the neighboring vehicles when it is judged that the lane cannot be changed;
a space-in-target space presence judgment part to judge whether there is a safely lane changeable space in the target space or not on the basis of the target space and the relative positions between the vehicle and the neighboring vehicles;
a lane change target speed calculation part to calculate a lane change target speed on the basis of the target space, the relative positions and the relative speeds between the vehicle and the neighboring vehicles and presence of the target space;
a speed control part to calculate target acceleration and target deceleration on the basis of the lane change target speed and the speed of the vehicle;
a throttle control part to control a throttle on the basis of the target acceleration; and
a brake control part to control a brake on the basis of the target deceleration.

17. A drive assist system according to claim 16, further comprising
a target speed selection part to select any one of the lane change target speed and an adaptive cruise control (ACC) target speed selected by the driver in adaptive cruise control (ACC) as a final target speed.

18. A drive assist system according to claim 1, further comprising
a lane change part to detect a relative position between the vehicle and the lane when it is judged that the lane can be changed and to control steering on the basis of the relative position and the speed of the vehicle to change the lane.

19. A drive assist system according to claim 1, wherein the input device comprises winkers.

* * * * *